(12) United States Patent
Yokoo et al.

(10) Patent No.: US 12,498,604 B2
(45) Date of Patent: Dec. 16, 2025

(54) OPTICAL SYSTEM, DISPLAY APPARATUS HAVING THE SAME, AND CONTROL APPARATUS

(71) Applicant: CANON KABUSHIKI KAISHA, Tokyo (JP)

(72) Inventors: Hideaki Yokoo, Kanagawa (JP); Junichiro Iwamatsu, Kanagawa (JP); Nobuyoshi Suzuki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 376 days.

(21) Appl. No.: 18/351,304

(22) Filed: Jul. 12, 2023

(65) Prior Publication Data

US 2024/0019737 A1 Jan. 18, 2024

(30) Foreign Application Priority Data

Jul. 14, 2022 (JP) .................................. 2022-112856

(51) Int. Cl.
*G02F 1/13363* (2006.01)
*G02F 1/01* (2006.01)
*G02F 1/133* (2006.01)

(52) U.S. Cl.
CPC ...... *G02F 1/133638* (2021.01); *G02F 1/0136* (2013.01); *G02F 1/13306* (2013.01); *G02F 2413/02* (2013.01); *G02F 2413/05* (2013.01)

(58) Field of Classification Search
CPC .................................................. G02F 1/133638
See application file for complete search history.

(56) References Cited

U.S. PATENT DOCUMENTS

| | | | |
|---|---|---|---|
| 2020/0249480 A1* | 8/2020 | Martinez | G02F 1/133528 |
| 2021/0271082 A1* | 9/2021 | Smith | G02B 5/3083 |

FOREIGN PATENT DOCUMENTS

| | | |
|---|---|---|
| JP | 2003-153048 A | 5/2003 |
| JP | 2019-023683 A | 2/2019 |

\* cited by examiner

*Primary Examiner* — Edmond C Lau
(74) *Attorney, Agent, or Firm* — Cowan, Liebowitz & Latman, P.C.

(57) ABSTRACT

An optical system includes, in order from a side of an exit pupil to a side of a display element, a polarization selective half-transmissive reflective element, a first quarter waveplate, an optical member including a half-transmissive reflective surface, a second quarter waveplate, and a polarizer, and is configured to guide light from the display element to the exit pupil. The optical system is changeable between a first state in which polarization directions of the polarization selective half-transmissive reflective element and the polarizer are orthogonal to each other, and a second state in which the polarization directions of the polarization selective half-transmissive reflective element and the polarizer coincide with each other.

20 Claims, 3 Drawing Sheets

OPTICAL SYSTEM, DISPLAY APPARATUS HAVING THE SAME, AND CONTROL APPARATUS

BACKGROUND

Technical Field

One of the aspects of the disclosure relates to an optical system for a display apparatus that mainly covers the head or face of an observer and displays an image in front of his eyes.

Description of Related Art

In a head mount display (HMD) in nonuse, strong light such as sunlight enters through openings in eyepiece units, is condensed on the surfaces of the display elements, and may cause the display elements to burn and deteriorate. This phenomenon has also been a problem in electronic viewfinders and image sensors, and countermeasures have been conventionally proposed. Japanese Patent Laid-Open No. 2003-153048 discloses a configuration that moves an eyepiece lens in the optical axis direction so that incident sunlight is not condensed on a display element in nonuse. Japanese Patent Laid-Open No. 2019-23683 discloses a configuration for attenuating light incident onto an image sensor by providing two polarizing filters between a lens mount and the image sensor, and by rotating one filter in conjunction with the attachment, detachment, and rotation operations of the interchangeable lens.

The configuration disclosed in Japanese Patent Laid-Open No. 2003-153048 moves the lens in the optical axis direction and causes the body to be large in the optical axis direction. The configuration disclosed in Japanese Patent Laid-Open No. 2019-23683 provides the two polarizing filters and thus increases the apparatus size in the optical axis direction. In addition, the polarizing filters, which are essentially unnecessary for imaging, may deteriorate the captured image quality.

SUMMARY

An optical system according to one aspect of the disclosure includes, in order from a side of an exit pupil to a side of a display element, a polarization selective half-transmissive reflective element, a first quarter waveplate, an optical member including a half-transmissive reflective surface, a second quarter waveplate, and a polarizer, and is configured to guide light from the display element to the exit pupil. The optical system is changeable between a first state in which polarization directions of the polarization selective half-transmissive reflective element and the polarizer are orthogonal to each other, and a second state in which the polarization directions of the polarization selective half-transmissive reflective element and the polarizer coincide with each other. A display apparatus having the above optical system also constitutes another aspect of the disclosure.

A control apparatus according to another aspect of the disclosure for a display apparatus that includes a display element and an optical system that includes, in order from a side of an exit pupil to a side of the display element, a polarization selective half-transmissive reflective element, a first quarter waveplate, an optical member including a half-transmissive reflective surface, a second quarter waveplate, and a polarizer, and is configured to guide light from the display element to the exit pupil includes a memory storing instructions, and a processor configured to execute the instructions to control a polarization direction the polarizer so as to set a first state in which a polarization direction of the polarization selective half-transmissive reflective element and the polarization direction of the polarizer are orthogonal to each other in a case where the display apparatus is not in a predetermined state, and control the polarization direction the polarizer so as to set a second state in which the polarization directions of the polarization selective half-transmissive reflective element and the polarizer coincide with each other in a case where the display apparatus is in the predetermined state.

Further features of the disclosure will become apparent from the following description of embodiments with reference to the attached drawings.

DESCRIPTION OF THE EMBODIMENTS

Figure 1:
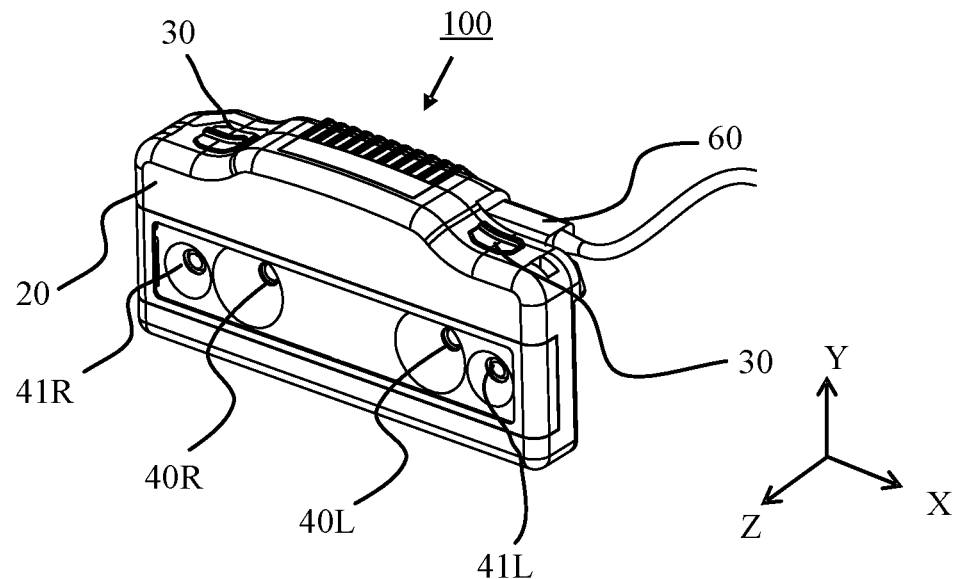
FIG. 1 is a front perspective view of an image display apparatus according to this embodiment.

Referring now to the accompanying drawings, a detailed description will be given of embodiments according to the disclosure. Corresponding elements in respective figures will be designated by the same reference numerals, and a duplicate description thereof will be omitted.

Figure 2:
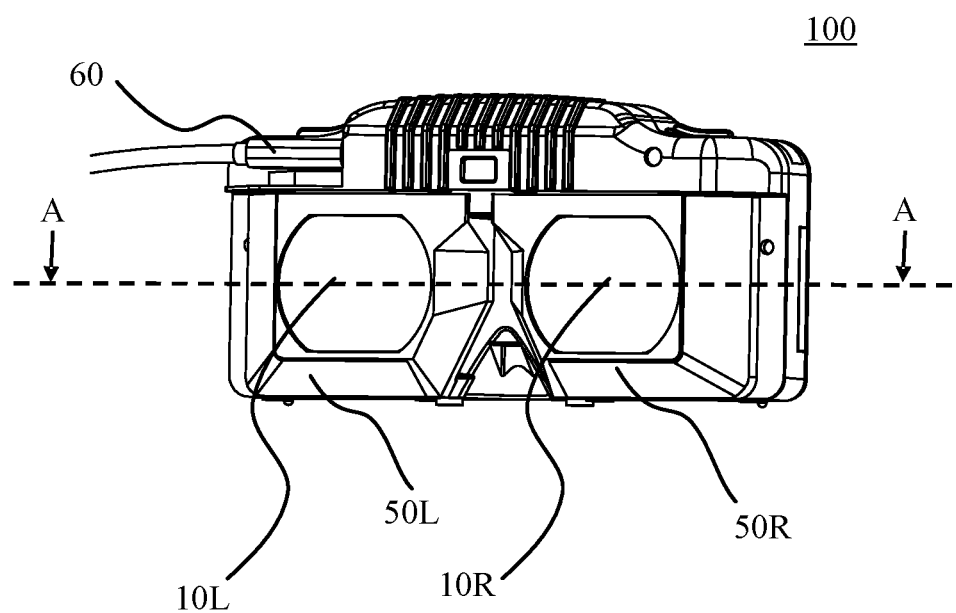
FIG. 2 is a rear perspective view of the image display apparatus according to this embodiment.

FIGS. 1 and 2 are respectively a front perspective view and a rear perspective view of a head mount display (HMD) 100, which is an example of an image display apparatus according to one embodiment of the disclosure. A Z-axis direction is a direction parallel to the respective optical axes of the pair of eyepiece optical systems (optical systems). An X-axis direction is a direction connecting the centers of the two optical axes of a pair of eyepiece optical systems. A Y-axis direction is a direction orthogonal to the X-axis direction and the Z-axis direction.

The HMD 100 is a video see-through type HMD that seamlessly fuses the real space and virtual space on a real-time basis to provide mixed reality and augmented reality. The HMD 100 captures an external image (optical image) observed by an observer through an imaging optical system with an image sensor, and displays on a display apparatus a display image in which a computer graphic (CG) image is superimposed on the acquired captured image. An observer can observe the display image through the eyepiece optical system. In a case where the optical axis of the eyepiece optical system and the optical axis of the imaging optical system shift from each other in the HMD 100, the observer feels uncomfortable with the display image. In a case where the HMD 100 becomes large in the optical axis direction, the observer tends to feel uncomfortable with the display image or uncomfortable in wearing the HMD 100. In order to restrain the shift between the optical axis of the eyepiece optical system and the optical axis of the imaging optical system, it is important to make the HMD 100 thinner. In addition, making thinner the HMD 100 can improve the feeling of use in a case where the HMD 100 is attached. The HMD 100 can be attached to the head of the observer or covered on the face by a band-shaped or spectacle-shaped attachment portion.

The HMD 100 includes a pair of eyepiece optical systems 10L and 10R corresponding to the left and right eyes of the observer. The eyepiece optical systems 10L and 10R are covered with an exterior member 20. Images having parallax are projected onto the eyepiece optical systems 10L and 10R for the left eye and the right eye, respectively, so that the observer can view a stereoscopic image. An operation member 30 operable by an observer is mounted on a top surface of the HMD 100. The operation member 30 is used to power on and off the HMD 100, select an item, change a parameter, and the like. Two types of camera units having different purposes are mounted on the front surface of the HMD 100. Objective camera units 40L and 40R as imaging optical systems correspond to eyepiece optical systems 10L and 10R, respectively, and obtain images for the left and right eyes. The objective camera units 40L and 40R may be cameras that can capture high-resolution color images. Position detecting camera units 41L and 41R detect the position and orientation of the HMD 100 in the real space. In superimposing CG images on the images acquired by the objective camera units 40L and 40R, projected images may be quickly switched in response to the body movement of the observer. The position detecting camera units 41L and 41R may be cameras that can acquire images with a high frame rate and little distortion.

As illustrated in FIG. 2, the HMD 100 may include eyecups 50L and 50R that cover the side surfaces of the eyepiece optical systems 10L and 10R. The eyecups 50L and 50R reduce the hindrance to viewing of images caused by reflections of light incident from the sides of the face of the observer on the surfaces of the eyepiece optical systems 10L and 10R. The HMD 100 is connected to an external communication apparatus such as a PC and a battery via a communication cable 60, and is supplied with data and power regarding images to be projected on the display panels (display elements) of the eyepiece optical systems 10L and 10R.

A description will now be given of the lens configurations of the eyepiece optical systems 10L and 10R and the optical paths using polarization in a case where the HMD 100 is used.

Figure 3:
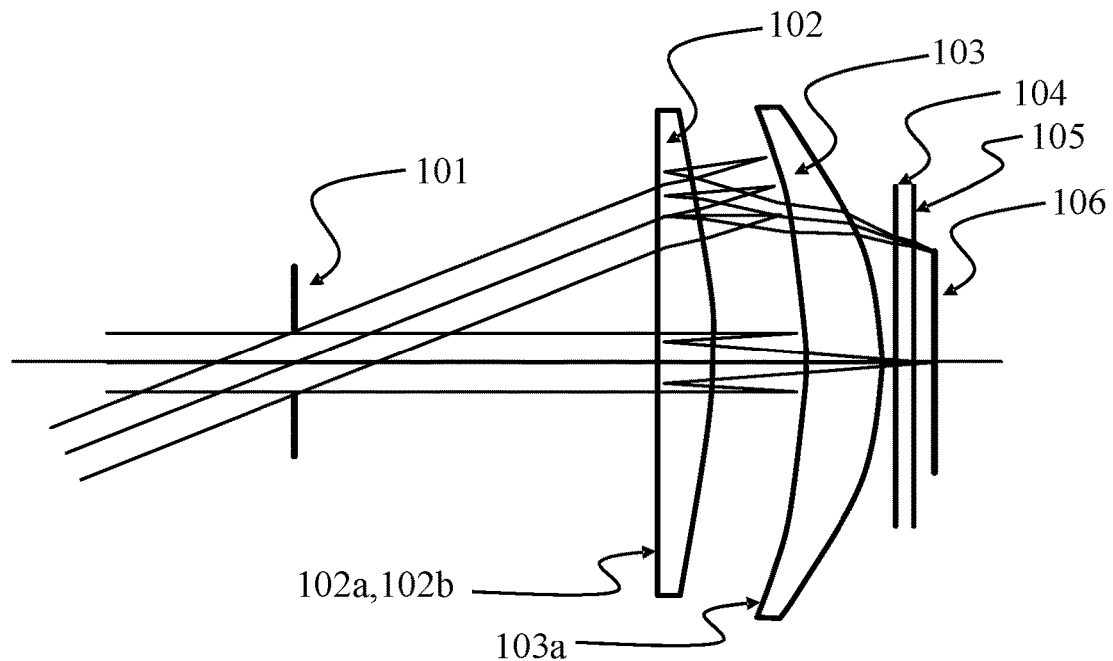
FIG. 3 is a lens sectional view of an eyepiece optical system.

FIG. 3 is a lens sectional view of the eyepiece optical systems 10L and 10R. Each of the eyepiece optical systems 10L and 10R includes, in order from a side of an exit pupil 101 to a side of a display panel 106, a first lens 102, a second lens (optical member) 103, a second quarter waveplate 104, a polarizer 105, and the display panel 106. A polarization selective half-transmissive reflective element (polarization beam splitter (PBS) hereinafter) 102a and a first quarter waveplate 102b are arranged on the surface on the exit pupil 101 side of the first lens 102 from the exit pupil 101 side to the display panel 106 side. The surface on the exit pupil side of the first lens 102 functions as a first half-transmissive reflective surface. A half-mirror 103a serving as a half-transmissive reflective element is disposed on the surface of the second lens 103 on the exit pupil 101 side. A surface of the second lens 103 on the side of the exit pupil 101 functions as a second half-transmissive reflective surface.

The PBS 102a is, for example, a wire grid polarizer configured to reflect linearly polarized light polarized in the same direction as that in a case where the light transmits through the polarizer 105 and to transmit linearly polarized light polarized in a direction orthogonal to that direction. The wire grid forming surface of the PBS 102a functions as a half-transmissive reflective surface. The first quarter waveplate 102b and the second quarter waveplate 104 are arranged with their slow axes tilted by 90 degrees, and the second quarter waveplate 104 and the polarizer 105 are arranged such that the slow axis of is second quarter waveplate 104 is tilted by 45 degrees relative to the polarization transmission axis of the polarizer 105. The half-mirror 103a is, for example, a half-mirror made of a dielectric multilayer film, and functions as a half-transmissive reflective surface.

The eyepiece optical systems 10L and 10R can be changed between a first state (state in use) in which the polarization directions of the PBS 102a and the polarizer 105 are orthogonal to each other, and a second state (state in nonuse) in which the polarization directions of the PBS 102a and the polarizer 105 coincide with each other. This embodiment can change the eyepiece optical systems 10L and 10R between the first state and the second state by changing the phase of the polarizer 105 (by changing the polarization direction of the polarizer 105). In addition, "orthogonal" includes not only strictly orthogonal, but also substantially orthogonal (approximately orthogonal). In addition, "coincide" includes not only strictly coincide but also substantially coincide (approximately coincide).

In this embodiment, the eyepiece optical systems 10L and 10R are changed between the first state and the second state according to the state of the HMD 100. The state of the HMD 100 includes, for example, whether it is powered on, powered off, in a sleep mode, or the like. For example, in a case where the HMD 100 is powered on, the eyepiece optical systems 10L and 10R are changed to the first state, and in a case where the HMD 100 is powered off, the eyepiece optical systems 10L and 10R are changed to the second state. In a case where each eyepiece optical system is in the first state and the orientation of the HMD 100 is maintained in a state in which the direction from the display panel 106 side to the exit pupil 101 side is vertically upward for a predetermined time or longer, each eyepiece optical system may be changed to the second state. The vertically upward direction from the display panel 106 side to the exit pupil 101 side need not be strictly vertically upward, and may be substantially vertically upward.

Figure 4:
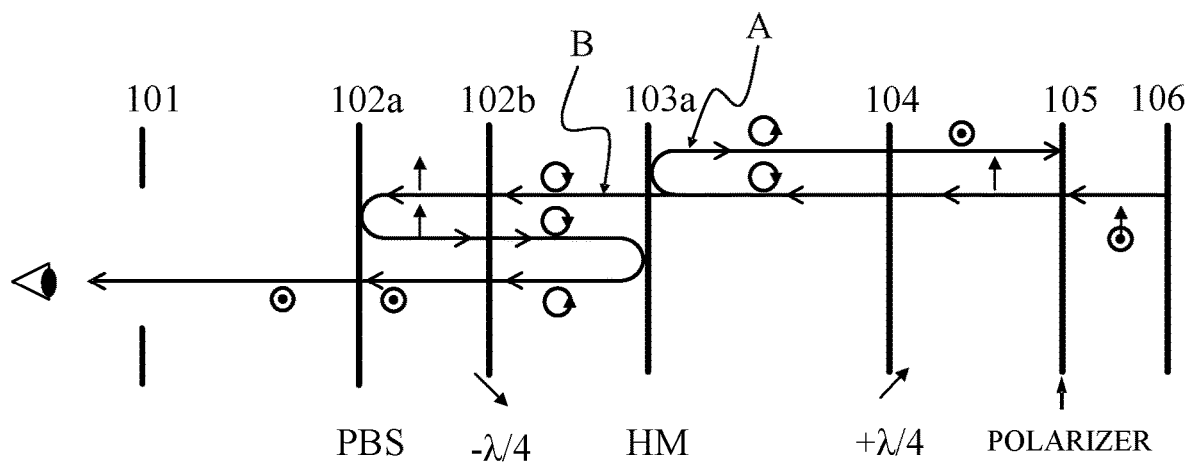
FIG. 4 explains an optical path of an observation optical system using polarized light.

FIG. 4 explains the optical path of the observation optical system using polarization. Light emitted from the display panel 106 is unpolarized light, and only linearly polarized light polarized in a first direction (first polarization direction) by the polarizer 105 transmits through the polarizer 105. The light that has transmitted through the polarizer 105 becomes circularly polarized light by the second quarter waveplate 104 and is divided by the half-mirror 103a into reflected light (first reflected light on optical path A) and transmitting light (first transmitting light on optical path B).

The first reflected light on the optical path A is reflected by the half-mirror 103a, becomes reversely circularly polarized light, and returns to the second quarter waveplate 104. The reversely circularly polarized light that has returned to the second quarter waveplate 104 transmits through the second quarter waveplate 104, becomes linearly polarized light polarized in a second direction (second polarization direction) orthogonal to the first direction, and is absorbed by the polarizer 105.

The first transmitting light on the optical path B that has transmitted through the half-mirror 103a becomes linearly polarized light polarized in the first direction by the first quarter waveplate 102b, and enters the PBS 102a. The linearly polarized light polarized in the first direction is reflected by the PBS 102a due to the polarization selectivity of the PBS 102a. The light reflected by the PBS 102a becomes circularly polarized light by the first quarter waveplate 102b and enters the half-mirror 103a. The light reflected by the half-mirror 103a becomes circularly polarized light that rotates in a direction reverse to that of pre-reflection light, enters the first quarter waveplate 102b, becomes linearly polarized light polarized in the second direction, and enters the PBS 102a. The linearly polarized light polarized in the second direction transmits through the PBS 102a and is guided to the exit pupil 101 due to the polarization selectivity of the PBS 102a.

Due to the above configuration, only the light that has transmitted through the second half-transmissive reflective surface, been reflected by the first half-transmissive reflective surface, been reflected by the second half-transmissive reflective surface, and transmitted through the first half-transmissive reflective surface is guided to the exit pupil 101.

A description will now be given of an optical path along which external light incident from the exit pupil 101 on the eyepiece optical systems 10L and 1 OR is condensed on the display panel 106 in a case where the HMD 100 is used.

Figure 5:
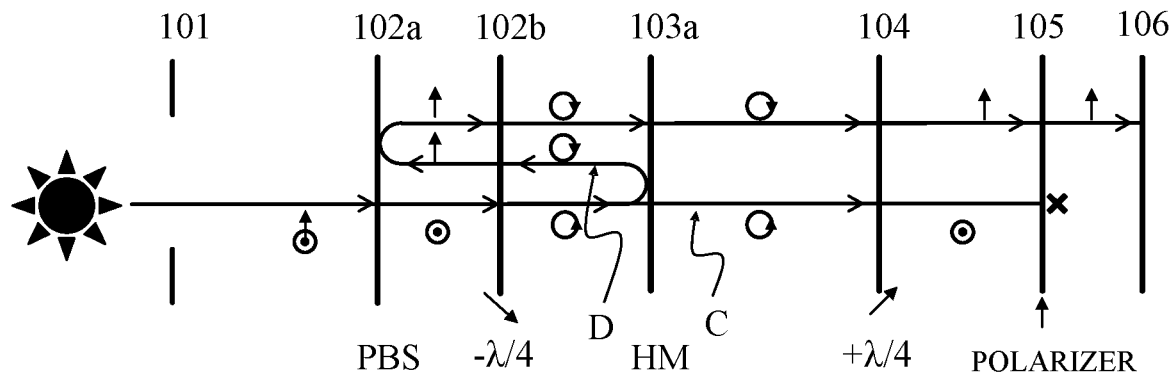
FIG. 5 explains the optical path of the observation optical system in a case where external light enters a display panel while the image display apparatus is in use.

FIG. 5 explains the optical path of the observation optical system in a case where the external light enters the display panel 106 while the HMD 100 is in use. The external light incident from the exit pupil 101 is nonpolarized light, and only linearly polarized light polarized in the second direction by the PBS 102a transmits through the PBS 102a. The light that has transmitted through the PBS 102a becomes circularly polarized light by the first quarter waveplate 102b, and is divided into transmitting light (second transmitting light on optical path C) and reflected light (second reflected light on optical path D) by the half-mirror 103a.

The second transmitting light on the optical path C that has transmitted through the half-mirror 103a becomes linearly polarized light polarized in the second direction by the second quarter waveplate 104 and is absorbed by the polarizer 105.

The second reflected light on the optical path D becomes circularly polarized light reverse to the pre-reflection light, enters the first quarter waveplate 102b, becomes linearly polarized light polarized in the first direction, and enters the PBS 102a. The linearly polarized light polarized in the first direction is reflected by the PBS 102a due to the polarization selectivity of the PBS 102a. The light reflected by the PBS 102a becomes circularly polarized light by the first quarter waveplate 102b and enters the half-mirror 103a. The light that has transmitted through the half-mirror 103a becomes linearly polarized light polarized in the first direction by the second quarter waveplate 104, transmits through the polarizer 105, and enters the display panel 106.

Due to the above configuration, only the light that has transmitted through the first half-transmissive reflective surface, been reflected by the second half-transmissive reflective surface, been reflected by the first half-transmissive reflective surface, and transmitted through the second half-transmissive reflective surface is guided to the display panel 106. The light incident on the display panel 106 along the optical path is condensed on the surface of the display panel 106 by the first lens 102 and the second lens 103. Therefore, in a case where the natural light incident on the exit pupil 101 is high-intensity light such as sunlight, the surface of the display panel 106 may deteriorate.

A description will now be given of a method of reducing deterioration of the display panel 106 by changing the polarization direction of the polarizer 105 in a case where the HMD 100 according to this embodiment is not in use. In changing the polarization direction of the polarizer 105, the element itself may be rotated by degrees. In a case where the polarizer 105 is an element that utilizes the polarization characteristic of liquid crystal, the polarization direction may be changed by changing the voltage application state to the polarizer 105.

Figure 6:
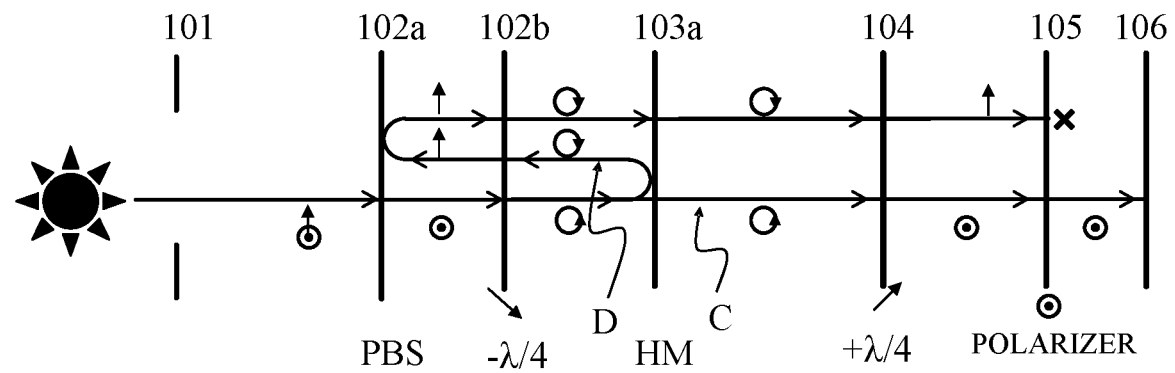
FIG. 6 explains the optical path of the observation optical system in a case where external light enters the display panel while the image display apparatus is in use.

FIG. 6 explains the optical path of the observation optical system in a case where external light enters the display panel 106 while the HMD 100 is not in use. In this embodiment, in a case where the HMD 100 is not used, the polarizer 105 is rotated by 90 degrees relative to the state in a case where the HMD 100 is used (in the state illustrated in FIG. 5).

The external light incident from the exit pupil 101 is nonpolarized light, and only linearly polarized light polarized in the second direction by the PBS 102a transmits through the PBS 102a. The light that has transmitted through the PBS 102a becomes circularly polarized by the first quarter waveplate 102b, and is divided into transmitting light (second transmitting light on optical path C) and reflected light (second reflected light on optical path D) by the half-mirror 103a.

The second transmitting light on the optical path C that has transmitted through the half-mirror 103a becomes linearly polarized light polarized in the second direction by the second quarter waveplate 104. At this time, the polarizer 105 has been rotated by 90 degrees relative to the state illustrated in FIG. 5, and thus the linearly polarized light polarized in the second direction transmits through the polarizer 105 and enters the display panel 106.

The second reflected light on the optical path D becomes circularly polarized light reverse to the pre-reflection light, enters the first quarter waveplate 102b, becomes linearly polarized light polarized in the first direction, and enters the PBS 102a. The linearly polarized light polarized in the first direction is reflected by the PBS 102a due to the polarization selectivity of PBS 102a. The light reflected by the PBS 102a becomes circularly polarized light by the first quarter waveplate 102b and enters the half-mirror 103a. The light that has transmitted through the half-mirror 103a becomes linearly polarized light polarized in the first direction by the second quarter waveplate 104 and enters the polarizer 105. At this time, the polarizer 105 has been rotated by 90 degrees relative to the state illustrated in FIG. 5, and thus the linearly polarized light polarized in the first direction is absorbed by the polarizer 105.

Due to the above configuration, only the light that has transmitted through the first half-transmissive reflective surface and the second half-transmissive reflective surface is guided to the display panel 106. The light incident on the display panel 106 along the optical path is not condensed on the surface of the display panel 106 by the first lens 102 and the second lens 103. Therefore, even if the natural light incident on the exit pupil 101 is high-intensity light such as sunlight, deterioration of the surface of the display panel 106 can be reduced.

This embodiment can provide an optical system and a display apparatus, each of which can reduce deterioration of the display element due to strong light incident through the opening in the eyepiece unit in nonuse without increasing the size in the optical axis direction.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

For example, the disclosure can provide a control apparatus for a display apparatus that includes a display element and an optical system that includes, in order from a side of an exit pupil to a side of the display element, a polarization selective half-transmissive reflective element, a first quarter waveplate, an optical member including a half-transmissive reflective surface, a second quarter waveplate, and a polarizer, and is configured to guide light from the display element to the exit pupil. The control apparatus includes a memory storing instructions, and a processor configured to execute the instructions to control a polarization direction the polarizer so as to set a first state in which a polarization direction of the polarization selective half-transmissive reflective element and the polarization direction of the polarizer are orthogonal to each other in a case where the display apparatus is not in a predetermined state, and control the polarization direction the polarizer so as to set a second state in which the polarization directions of the polarization selective half-transmissive reflective element and the polarizer coincide with each other in a case where the display apparatus is in the predetermined state. The predetermined state may be a state in which the display apparatus is powered off or a sleep mode state.

This application claims the benefit of Japanese Patent Application No. 2022-112856, filed on Jul. 14, 2022, which is hereby incorporated by reference herein in its entirety.

What is claimed is:

1. An optical system comprising, in order from a side of an exit pupil to a side of a display element, a polarization selective half-transmissive reflective element, a first quarter waveplate, an optical member including a half-transmissive reflective surface, a second quarter waveplate, and a polarizer, and configured to guide light from the display element to the exit pupil,
   wherein the optical system is changeable between a first state in which polarization directions of the polarization selective half-transmissive reflective element and the polarizer are orthogonal to each other, and a second state in which the polarization directions of the polarization selective half-transmissive reflective element and the polarizer coincide with each other.

2. The optical system according to claim 1, wherein the polarization selective half-transmissive reflective element is configured to reflect light in a first polarization direction and to transmit light in a second polarization direction orthogonal to the first polarization direction, and
   wherein in the first state, the polarizer is configured to transmit the light in the first polarization direction and to absorb the light in the second polarization direction, and in the second state, the polarizer is configured to absorb the first polarization direction and to transmit the light in the second polarization direction.

3. The optical system according to claim 1, wherein in the second state, the polarizer is configured to absorb part of external light that has transmitted through the half-transmissive reflective surface after having been reflected by the polarization selective half-transmissive reflective element.

4. The optical system according to claim 1, wherein the first quarter waveplate and the second quarter waveplate are arranged so that a slow axis of the first quarter waveplate and a slow axis of the second quarter waveplate are tilted by degrees, and
   wherein the second quarter waveplate is disposed so that the slow axis of the second quarter waveplate is tilted 45 degrees relative to a polarization transmission axis of the polarizer.

5. The optical system according to claim 1, wherein the optical system is changeable between the first state and the second state by rotating the polarizer by 90 degrees.

6. The optical system according to claim 1, wherein the polarizer is an element that utilizes a polarization characteristic of liquid crystal, and
   wherein the optical system is changeable between the first state and the second state by changing a voltage application state to the polarizer.

7. The optical system according to claim 1,
   wherein in the first state,
   light from the display element transmits through the polarizer, transmits through the second quarter waveplate, and is divided into first reflected light reflected by the half-transmissive reflective surface and first transmitting light that transmits through the half-transmissive reflective surface,
   the first reflected light transmits through the second quarter waveplate and is absorbed by the polarizer, and
   the first transmitting light transmits through the first quarter waveplate, is reflected by the polarization selective half-transmissive reflective surface, transmits through the first quarter waveplate, is reflected by the half-transmissive reflective surface, transmits through the first quarter waveplate, transmits through the polarization selective half-transmissive reflective element, and enters the exit pupil, and
   wherein in the second state,
   external light transmits through the polarization selective half-transmissive reflective element, transmits through the first quarter waveplate, and is divided into second transmitting light that transmits through the half-transmissive reflective surface and second reflected light that is reflected by the half-transmissive reflective surface,
   the second transmitting light transmits through the second quarter waveplate, transmits through the polarizer, and enters the display element, and
   the second reflected light transmits through the first quarter waveplate, is reflected by the polarization selective half-transmissive reflective element, transmits through the first quarter waveplate, transmits through the half-transmissive reflective surface, transmits through the second quarter waveplate, and is absorbed by the polarizer.

8. A display apparatus comprising:
   a display element; and
   an optical system that includes, in order from a side of an exit pupil to a side of the display element, a polarization selective half-transmissive reflective element, a first quarter waveplate, an optical member including a half-transmissive reflective surface, a second quarter waveplate, and a polarizer, and is configured to guide light from the display element to the exit pupil,
   wherein the optical system is changeable between a first state in which polarization directions of the polarization selective half-transmissive reflective element and the polarizer are orthogonal to each other, and a second state in which the polarization directions of the polarization selective half-transmissive reflective element and the polarizer coincide with each other.

9. The display apparatus according to claim 8, wherein the polarization selective half-transmissive reflective element is configured to reflect light in a first polarization direction and to transmit light in a second polarization direction orthogonal to the first polarization direction, and wherein in the first state, the polarizer is configured to transmit the light in the first polarization direction and to absorb the light in the second polarization direction, and in the second state, the polarizer is configured to absorb the first polarization direction and to transmit the light in the second polarization direction.

10. The display apparatus according to claim 8, wherein in the second state, the polarizer is configured to absorb part of external light that has transmitted through the half-transmissive reflective surface after having been reflected by the polarization selective half-transmissive reflective element.

11. The display apparatus according to claim 8, wherein the first quarter waveplate and the second quarter waveplate are arranged so that a slow axis of the first quarter waveplate and a slow axis of the second quarter waveplate are tilted by degrees, and wherein the second quarter waveplate is disposed so that the slow axis of the second quarter waveplate is tilted 45 degrees relative to a polarization transmission axis of the polarizer.

12. The display apparatus according to claim 8, wherein the optical system is changeable between the first state and the second state by rotating the polarizer by 90 degrees.

13. The display apparatus according to claim 8, wherein the polarizer is an element that utilizes a polarization characteristic of liquid crystal, and wherein the optical system is changeable between the first state and the second state by changing a voltage application state to the polarizer.

14. The display apparatus according to claim 8,
wherein in the first state,
light from the display element transmits through the polarizer, transmits through the second quarter waveplate, and is divided into first reflected light reflected by the half-transmissive reflective surface and first transmitting light that transmits through the half-transmissive reflective surface, the first reflected light transmits through the second quarter waveplate and is absorbed by the polarizer, and the first transmitting light transmits through the first quarter waveplate, is reflected by the polarization selective half-transmissive reflective element, transmits through the first quarter waveplate, is reflected by the half-transmissive reflective surface, transmits through the first quarter waveplate, transmits through the polarization selective half-transmissive reflective element, and enters the exit pupil, and wherein in the second state,
external light transmits through the polarization selective half-transmissive reflective element, transmits through the first quarter waveplate, and is divided into second transmitting light that transmits through the half-transmissive reflective surface and second reflected light that is reflected by the half-transmissive reflective surface, the second transmitting light transmits through the second quarter waveplate, transmits through the polarizer, and enters the display element, and the second reflected light transmits through the first quarter waveplate, is reflected by the polarization selective half-transmissive reflective element, transmits through the first quarter waveplate, transmits through the half-transmissive reflective surface, transmits through the second quarter waveplate, and is absorbed by the polarizer.

15. The display apparatus according to claim 8, wherein the optical system is changeable between the first state and the second state according to a state of the display apparatus.

16. The display apparatus according to claim 8, wherein the optical system is in the first state in a case where the display apparatus is powered on, and the optical system is in the second state in a case where the display apparatus is powered off.

17. The display apparatus according to claim 8, wherein in a case where the optical system is in the first state and orientation of the display apparatus is maintained for a predetermined time or longer such that a direction from the side of the display element to the side of the exit pupil is vertically upward, the optical system is changed to the second state.

18. The display apparatus according to claim 8, wherein the display apparatus is attachable to a head of an observer.

19. A control apparatus for a display apparatus that includes a display element and an optical system that includes, in order from a side of an exit pupil to a side of the display element, a polarization selective half-transmissive reflective element, a first quarter waveplate, an optical member including a half-transmissive reflective surface, a second quarter waveplate, and a polarizer, and is configured to guide light from the display element to the exit pupil, the control apparatus comprising:

a memory storing instructions; and
a processor configured to execute the instructions to:
control a polarization direction the polarizer so as to set a first state in which a polarization direction of the polarization selective half-transmissive reflective element and the polarization direction of the polarizer are orthogonal to each other in a case where the display apparatus is not in a predetermined state, and
control the polarization direction the polarizer so as to set a second state in which the polarization directions of the polarization selective half-transmissive reflective element and the polarizer coincide with each other in a case where the display apparatus is in the predetermined state.

20. The control apparatus according to claim 19, wherein the predetermined state is a state in which the display apparatus is powered off or a sleep mode state.

* * * * *